(12) United States Patent
Nose

(10) Patent No.: US 11,042,333 B2
(45) Date of Patent: Jun. 22, 2021

(54) ELECTRONIC APPARATUS, PROGRAM, AND IMAGE PROCESSING METHOD FOR AGGREGATE PRINTING USING A TARGET RANGE

(71) Applicant: SEIKO EPSON CORPORATION, Tokyo (JP)

(72) Inventor: Yuki Nose, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/551,120

(22) Filed: Aug. 26, 2019

(65) Prior Publication Data
US 2020/0065034 A1  Feb. 27, 2020

(30) Foreign Application Priority Data

Aug. 27, 2018  (JP) .............................. JP2018-158087

(51) Int. Cl.
G06F 3/12      (2006.01)
H04N 1/32     (2006.01)
H04N 1/00     (2006.01)
H04N 1/387   (2006.01)

(52) U.S. Cl.
CPC .......... *G06F 3/1205* (2013.01); *G06F 3/1242* (2013.01); *G06F 3/1252* (2013.01); *H04N 1/00358* (2013.01); *H04N 1/00374* (2013.01); *H04N 1/32128* (2013.01); *H04N 1/3875* (2013.01); *H04N 2201/3269* (2013.01)

(58) Field of Classification Search
CPC .................. G06F 3/1242; G06F 3/125; H04N 1/00355–00379; H04N 1/3875; H04N 1/00358
See application file for complete search history.

(56) References Cited

U.S. PATENT DOCUMENTS

| | | | |
|---|---|---|---|
| 6,757,073 B1* | 6/2004 | Kuroda | G06F 3/1205 358/1.13 |
| 2003/0190145 A1* | 10/2003 | Copperman | G11B 27/11 386/241 |
| 2007/0070442 A1* | 3/2007 | Ohkubo | H04N 1/00442 358/451 |
| 2011/0096380 A1* | 4/2011 | Hanayama | H04N 1/6033 358/501 |
| 2016/0110144 A1* | 4/2016 | Bandyopadhyay | G03G 15/655 358/1.18 |

FOREIGN PATENT DOCUMENTS

JP    2017-153043    8/2017

* cited by examiner

*Primary Examiner* — Nicholas Pachol
(74) *Attorney, Agent, or Firm* — Workman Nydegger

(57) ABSTRACT

An electronic apparatus includes a reading unit, a processing unit, and a printing unit. The reading unit scans a reading target and acquires a plurality of scanned images. The processing unit performs processing to specify an aggregation target range which is a target of aggregate printing, of the plurality of scanned images, based on the plurality of scanned images. The printing unit aggregate-prints the scanned images specified as the aggregation target range, of the plurality of scanned images.

19 Claims, 14 Drawing Sheets

ELECTRONIC APPARATUS, PROGRAM, AND IMAGE PROCESSING METHOD FOR AGGREGATE PRINTING USING A TARGET RANGE

The present application is based on, and claims priority from JP Application Serial Number 2018-158087, filed Aug. 27, 2018, the disclosure of which is hereby incorporated by reference herein in its entirety.

BACKGROUND

1. Technical Field

The present disclosure relates to an electronic apparatus, a program, and an image processing method or the like.

2. Related Art

According to the related art, a technique called aggregate printing in which image data corresponding to a plurality of documents is printed on one print medium is extensively used. For example, JP-A-2017-153043 discloses a technique in which a document read by an image reading unit is aggregate-printed according to a preset set value. JP-A-2017-153043 also discloses a technique in which a font size in aggregate printing according to a set value is detected and in which an inquiry screen is displayed on a display unit in a predetermined case.

The degree of importance may vary from one document to another, for example, when one document set includes a part that needs careful reading and a part equivalent to a reference material. Therefore, there is a user's need to aggregate-print a part of the documents, instead of the entirety of the document set. However, the existing aggregate printing does not allow the user to designate an aggregation target range and therefore cannot easily meet the user's need.

SUMMARY

An aspect of the disclosure relates to an electronic apparatus including: a reading unit scanning a reading target and acquiring a plurality of scanned images; a processing unit performing processing to specify an aggregation target range which is a target of aggregate printing, of the plurality of scanned images, based on the plurality of scanned images as a result of the scanning by the reading unit; and a printing unit aggregate-printing the scanned images specified as the aggregation target range, of the plurality of scanned images.

DESCRIPTION OF EXEMPLARY EMBODIMENTS

Figure 1:
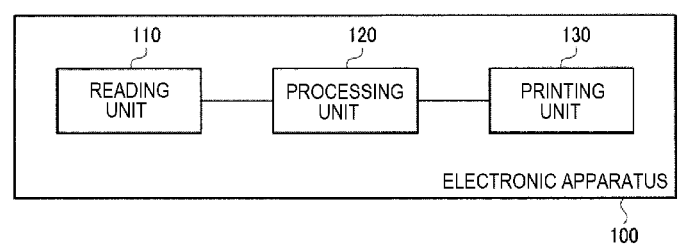
FIG. 1 shows a configuration example of an electronic apparatus.

Hereinafter, an embodiment will be described. The embodiment described below should not unduly limit the content of the disclosure described in the appended claims. Not all the components described in the embodiment are necessarily essential components of the disclosure.

1. Configuration Example of Electronic Apparatus

According to the related art, an apparatus reading a document set as a reading target by an image sensor and printing a scanned image as a result of reading is known. The document set in this case refers to a set of a plurality of documents batch-read by one read job. Also, an apparatus performing aggregate printing is known. The related-art aggregate printing is carried out based on a set value, using the entirety of a result of reading a document set as a target. The set value is, for example, the number of scanned images printed on one print sheet. Here, this number is called the number of aggregated images.

A plurality of scanned images as a result of reading a document set may include an image that should be printed by normal printing and an image that should be a target of aggregate printing. The normal printing in this case refers to processing to print one scanned image on one print sheet. It is now assumed, for example, that a document set includes a document that needs careful reading and a document equivalent to a reference material. To the reader, it is desirable that a scanned image as a result of reading a document that needs careful reading is normally printed. Meanwhile, it is desirable that a scanned image as a result of reading a document equivalent to a reference material is aggregate-printed. Using both normal printing and aggregate printing can maintain the ease of reading for the reader and can also save print sheets and ink. As described above, there is a user's need to aggregate-print a part of documents of a document set.

To meet this need, separate print jobs need to be given for a normally printed part and an aggregate-printed part. A desired result cannot be obtained, for example, unless the user carries out complex work of separating a document as a target of normal printing and a document as a target of aggregate printing and executing a read job and a print job for each of these documents.

JP-A-2017-153043 discloses a technique of additional printing in a non-aggregate mode. However, this technique carries out additional printing after aggregate printing of an entire document but does not aggregate-print a part of documents. Also, as a comparative example to this embodiment, there is a technique of displaying a result of scanning on a display unit and allowing the user to select a document as a target of aggregate printing. In this comparative example, the user needs to carry out a proper operation in order to obtain a desired result. Therefore, the user operation may become complex, or a user unfamiliar with the apparatus may not be able to carry out a proper operation. Also, an inexpensive apparatus may not be able to be provided with a display unit. Therefore, it is difficult to use the technique of comparative example.

FIG. 1 shows a configuration example of an electronic apparatus 100 in this embodiment. The electronic apparatus 100 includes a reading unit 110, a processing unit 120, and a printing unit 130. The reading unit 110 scans a reading target and acquires a plurality of scanned images SI. The reading target is specifically a document set including a plurality of documents. The processing unit 120 carries out processing to specify an aggregation target range ATR as a target of aggregate printing, of the plurality of scanned images SI, based on the plurality of scanned images SI. The plurality of scanned images SI is specifically scanned images acquired by reading the document set, and scanned images in a number corresponding to the number of documents included in the document set. The printing unit 130 aggregate-prints images specified as the aggregation target range ATR, of the plurality of scanned images SI.

In the technique in this embodiment, processing to specify an aggregation target range ATR, based on the result of scanning a reading target, is executed. Thus, a part of the plurality of documents as the reading target can be defined as a target of aggregate printing. In the technique in this embodiment, an aggregation target range ATR is automatically decided, based on the result of scanning. The user need not carryout an operation to designate an aggregation target range ATR, using an operation unit or the like of the electronic apparatus 100. This can reduce the burden on the user. The technique in this embodiment can also be applied to a case where the electronic apparatus 100 has no display unit.

Figure 2:
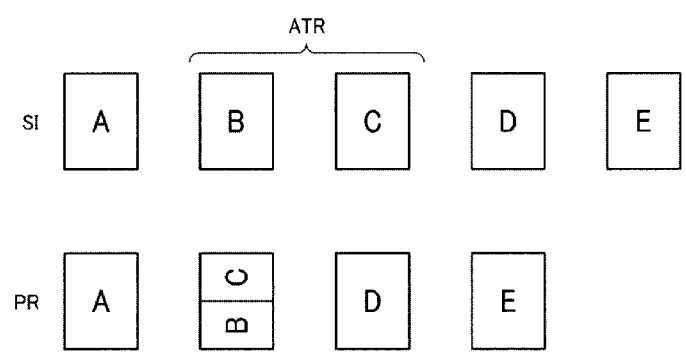
FIG. 2 is an explanatory view of aggregate printing according to an embodiment.

FIG. 2 is a schematic view explaining aggregate printing by the technique in this embodiment. A plurality of scanned images SI as a result of scanning is shown at the top of FIG. 2. In the example of FIG. 2, five scanned images shown as scanned images A to E are acquired by the reading unit 110. In the technique in this embodiment, a part of the five scanned images can be designated as an aggregation target range ATR. In the example of FIG. 2, a range having the scanned image B as a start point and the scanned image C as an end point is specified as an aggregation target range ATR by the processing unit 120. A print result PR by the printing unit 130 is shown at the bottom of FIG. 2. As shown in FIG. 2, the printing unit 130 aggregate-prints the scanned image B and the scanned image C and normally prints the scanned image A, the scanned image D, and the scanned image E.

The electronic apparatus 100 in this embodiment is a copying machine having a scanner function and a print function. The electronic apparatus 100 may also be a multifunction peripheral (MFP) having a scanner function, a print function, and a copy function. The electronic apparatus 100 as an MFP may also have another function such as a facsimile function.

Each part of the electronic apparatus 100 will now be described. The reading unit 110 includes a transport mechanism transporting a plurality of documents placed on a placement surface, one by one along a transport path. The transport mechanism includes, for example, a transport roller pair for transporting a document. The transport roller pair is formed of, for example, a drive roller and a driven roller. The reading unit 110 also includes a light source and an image sensor. The light source is formed of, for example, an LED (light-emitting diode), fluorescent lamp or the like. The image sensor receives reflected light of light emitted from the light source and reflected off a reading target such as a document, converts the received light into an electrical signal, and outputs a pixel signal corresponding to the amount of light received. The image sensor is, for example, a linear image sensor. The specific configuration of the reading unit 110 is not limited to the example described here and can be implemented with various modifications.

The processing unit 120 performs processing to control the reading unit 110 to acquire a result of scanning, processing to specify an aggregation target range ATR based on the result of scanning, and processing to cause the printing unit 130 to execute printing based on the result of specifying. The processing unit 120 performs, for example, processing to generate print data based on the aggregation target range ATR and cause the printing unit 130 to print the print data. The processing unit 120 performs processing to reduce documents included in the aggregation target range ATR and performs processing to juxtapose the reduced images, thus generating print data. As for a document not included in the aggregation target range ATR, the processing unit 120 directly uses its scanned image as print data. The processing unit 120 may also perform another image processing such as noise reduction, on the scanned image.

The processing unit 120 is formed of the following hardware. The hardware can include at least one of a circuit processing a digital signal and a circuit processing an analog signal. For example, the hardware can be formed of one or a plurality of circuit devices or one or a plurality of circuit elements, installed at a circuit board. The one or plurality of circuit devices is, for example, an IC or the like. The one or plurality of circuit elements is, for example, a resistor, capacitor or the like.

The processing unit 120 may also be implemented by the following processor. The electronic apparatus 100 in this embodiment includes a memory storing information, and a processor operating based on the information stored in the memory. The information is, for example, a program and various data or the like. The processor includes hardware. As the processor, various processors such as a CPU (central processing unit), GPU (graphics processing unit), and DSP (digital signal processor) can be used. The memory may be a semiconductor memory such as an SRAM (static random access memory) or DRAM (dynamic random access memory), a register, a magnetic storage device such as a hard disk device, or an optical storage device such as an optical disk device. For example, the memory stores a computer-readable command and the processor executes the command, thus implementing the function of each part of the electronic apparatus 100. The command in this case may be a command of a command set forming a program or may be a command instructing a hardware circuit of the processor to execute an operation.

The printing unit 130 includes a print engine. The print engine is a mechanical configuration executing print of an image onto a print medium. The print engine includes, for example, a transport mechanism, an inkjet ejection head, and a drive mechanism of a carriage including the ejection head, or the like. The print engine ejects ink from the ejection head onto a print medium transported by the transport mechanism and thus prints an image on the print medium. As the print medium, various media such as paper and cloth can be used. The specific configuration of the printing unit 130 and the print engine is not limited to the example described here and can be implemented with various modifications.

The electronic apparatus 100 may also include a configuration not illustrated in FIG. 1. For example, the electronic apparatus 100 includes a storage unit, a display unit, an operation unit, a communication unit, and the like. The storage unit stores various kinds of information such as data and program. The processing unit 120 operates, for examples, using the storage unit as a work area. The display unit is formed of a display or the like displaying various kinds of information to the user. The operation unit is formed of a button or the like accepting an input operation from the user. The display unit and the operation unit may be integrally formed as a touch panel. The communication unit is a communication interface communicating with another apparatus. The communication in this case may be wired or wireless.

The processing to specify an aggregation target range ATR and the print processing based on the specified aggregation target range ATR will now be described.

2. Aggregate Printing Using Mark

The processing unit 120 performs processing to detect a predetermined mark as an identifier based on a plurality of scanned images SI as a result of scanning and specify an aggregation target range ATR based on the identifier. The mark in this case is a specified shape pattern, color pattern, or combination of these. The mark according to the embodiment is, for example, a seal provided for the user. The user attaches the seal to a document of a reading target and thus attaches a mark as an identifier to the document. However, the mark according to the embodiment may be any mark that can be read by the reading unit 110 and that can be detected in the processing by the processing unit 120, and may be attached to the document in a form different from the seal.

2.1 Example of Attaching Mark to Start Point of Aggregation Target Range

The processing unit 120 specifies a scanned image that is a start point of an aggregation target range ATR, based on an identifier. The processing unit 120 specifies a final scanned image of scanned images in a predetermined number of aggregated images with the foregoing specified scanned image being the start point, as an endpoint of the aggregation target range ATR, and specifies the range from the start point to the end point as the aggregation target range ATR. Specifically, the processing unit 120 specifies a scanned image in which a mark is detected, as the start point of the aggregation target range ATR. The printing unit 130 aggregate-prints the scanned images by the number of aggregated images specified as the aggregation target range ATR, on one print medium. This enables aggregate printing on one print medium of a predetermined number of scanned images where a scanned image in which a mark is detected is the start point. In this technique, the correspondence between the aggregation target range ATR and the number of aggregated images is clear. Therefore, the technique is advantageous in that a blank space is less likely to be generated in the print result.

Figure 3:
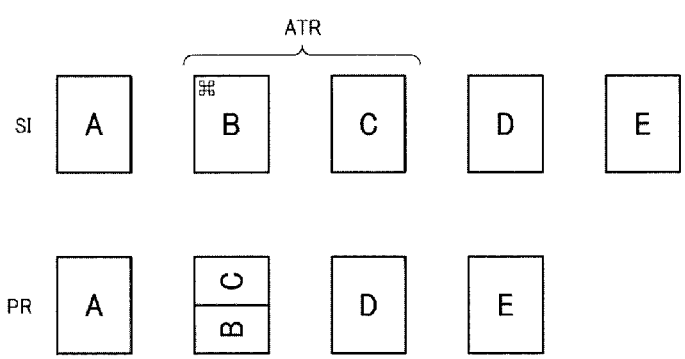
FIG. 3 is an explanatory view of aggregate printing where a mark is attached to the start point of an aggregation target range.

In the example shown in FIG. 3, as a plurality of scanned images SI, five scanned images shown as scanned images A to E are acquired by the reading unit 110. The user attaches a mark to the second sheet of the documents. The scanned image B, which is the result of reading the second sheet of the documents, is image data including a pattern corresponding to the mark.

The processing unit 120 performs mark detection processing on each of the acquired scanned images. The mark to specify the aggregation target range ATR is already known to the processing unit 120. The processing unit 120 performs mark detection processing, for example, by template matching using the known mark as a template image. Image processing to detect a predetermined pattern is widely known and can be broadly applied in this embodiment. In the example of FIG. 3, in the detection processing by the processing unit 120, a mark is detected in the scanned image B and no mark is detected in the other four scanned images. Thus, the processing unit 120 determines that the scanned image B is the start point of the aggregation target range ATR.

Here, the number of scanned images included in an aggregation target range ATR can be arbitrarily set. However, when the number of scanned images included in an aggregation target range ATR is not a multiple of the number of aggregated images, a blank space is generated in the print result, as described later with reference to FIG. 11 or the like. Therefore, it is desirable that an aggregation target range ATR specified by one mark includes a number of scanned images that is a multiple of the number of aggregated images. The minimum number of scanned images as a target of aggregate printing is the number of scanned images included in one aggregation target range ATR, and scanned images as an aggregation target cannot be changed by a smaller unit than that. The number of scanned images as a target of aggregate printing can be easily increased by attaching two or more marks. Therefore, there is little need to excessively increase the number of scanned images included in one aggregation target range ATR. Here, considering these points, the number of scanned images included in an aggregation target range ATR is equalized to the number of aggregated images.

As the number of aggregated images, a value such as 2, 4, or 8 is widely used. For example, the processing unit 120 holds three candidates, 2, 4, and 8, as number-of-aggregated-images candidates, and performs processing to decide one of the number-of-aggregated-images candidates, as the number of aggregated images. When an aggregation target range ATR is set, the processing unit 120 performs processing to aggregate-print the scanned images included in the aggregation target range ATR, based on the decided number of aggregated images. For example, when the number of aggregated images is $2^n$, the processing unit 120 reduces the length of each side of the scanned images included in the aggregation target range ATR by $1/(\sqrt{2}^n)$ and subsequently juxtapose the $2^n$ reduced images, thus generating print data for aggregate printing. In the foregoing example, n is one of 1, 2, and 3. While the processing on the assumption that the ratio of the long side to the short side of the document is $\sqrt{2}:1$ is described here, the processing to generate print data for aggregate printing can be carried out with various modifications. The number-of-aggregated-images candidates are not limited to the three candidates of 2, 4, and 8. Other number-of-aggregated-images candidates may be used, depending on the circumstances.

The number of aggregated images is, for example, a value decided based on the type of the identifier. Here, the identifier is a mark, and a correspondence between the type of the mark and the number of aggregated images is established. That is, the number of aggregated images is decided according to the type of the mark, such as a mark for N-image aggregation N or a mark for M-image aggregation. N is an integer equal to or greater than 2. M is an integer equal to or greater than 2 and not equal to N. In a narrow sense, N and M are numbers equal to one of the number-of-aggregated-images candidates.

In the mark detection processing, the processing unit 120 determines not only the presence/absence of a mark but also the type of the mark. For example, the processing unit 120 holds, in advance, template images in a number corresponding to the number of types of marks, and executes template matching using each template image. Thus, the number of aggregated images can be flexibly changed according to the type of the mark.

In the example of FIG. 3, the processing unit 120 detects a mark meaning two-image aggregation in the scanned image B. Here, it is assumed that the number of scanned images included in the aggregation target range ATR is equal to the number of aggregated images, as described above. Therefore, the processing unit 120 specifies a range having the scanned image B as the start point and the scanned image C as the end point, as the aggregation target range ATR. The scanned image C is the scanned image at the end when two scanned images equal to the number of aggregated images, with the scanned image B being the start point, are considered. The printing unit 130 aggregate-prints the scanned image B and the scanned image C on one print medium as shown in the print result PR in FIG. 3.

Figure 4:
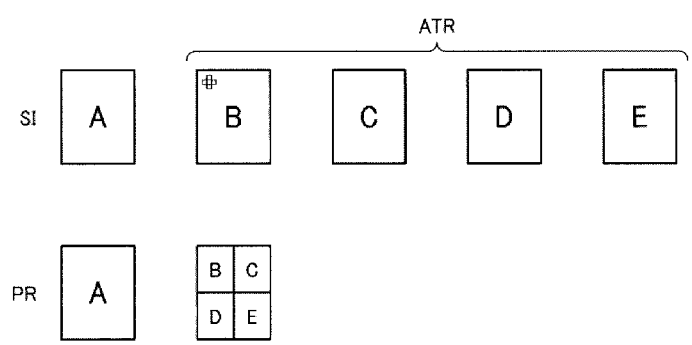
FIG. 4 is an explanatory view of aggregate printing where a mark is attached to the start point of an aggregation target range.

FIG. 4 is an example where a mark of a different type from that in FIG. 3 is detected. In the example of FIG. 4, the processing unit 120 detects a mark meaning four-image aggregation in the scanned image B. Therefore, the processing unit 120 specifies a range having the scanned image B as the start point and the scanned image E as the end point, as the aggregation target range ATR. The scanned image E is the scanned image at the end when four scanned images equal to the number of aggregated images, with the scanned image B being the start point, are considered. The printing unit 130 aggregate-prints the scanned images B to E one print medium as shown in the print result PR in FIG. 4.

The number of aggregated images may be a preset value. For example, the number of aggregated images may be set in advance to a predetermined value, using an operation interface of the electronic apparatus 100, and the processing unit 120 may perform processing using this number of aggregated images. In this case, the processing unit 120 specifies the aggregation target range ATR, based on the result of detecting the presence/absence of a mark, regardless of the type of the detected mark.

As described above, the processing unit 120 specifies scanned images corresponding to the number of aggregated images where a scanned image in which a mark is detected is the start point, as an aggregation target range ATR. However, the depending on the reading target, there may not be a sufficient number of scanned images behind a scanned image including a mark. The scanned image behind in this case refers to a scanned image scanned by the reading unit 110 at a relatively late timing, of a plurality of scanned images SI. Similarly, a scanned image ahead refers to a scanned image scanned by the reading unit 110 at a relatively early timing, of a plurality of scanned images SI. The scanned image at the end refers to a scanned image most behind in a predetermined range.

Figure 5:
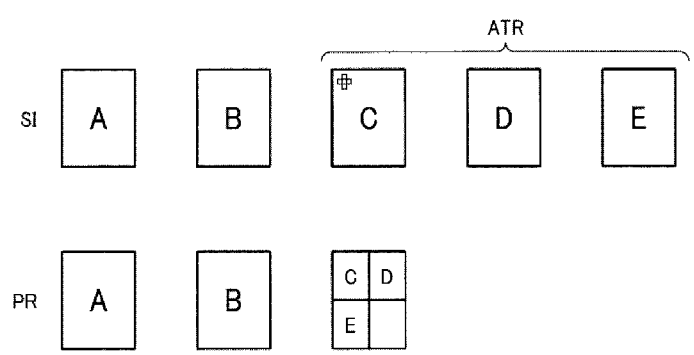
FIG. 5 is a schematic view explaining interpolation processing of a blank image.

FIG. 5 is a schematic view explaining an example where scanned images are insufficient for the number of aggregated images. As shown in FIG. 5, the processing unit 120 acquires five scanned images shown as scanned images A to E, as a plurality of scanned images SI, and detects a mark meaning four-image aggregation in the scanned image C. In this case, four scanned images with the scanned image C being the start point are targets of aggregate printing. However, in the example of FIG. 5, there are only three scanned images C to E with the scanned image C being the start point and therefore insufficient for the number of aggregated images of four.

When the number of scanned images from a first scanned image that is a scanned image specified as the start point of the aggregation target range ATR based on the identifier to a second scanned image that is the final scanned image is insufficient for the number of aggregated images by a predetermined number, the processing unit 120 performs supplement processing to add the predetermined number of blank images behind the second scanned image. That is, the processing unit 120 supplements the insufficiency with blank images. The processing unit 120 then specifies a range having the first scanned image as the start point and the final blank image of the predetermined number of blank images as the end point, as the aggregation target range ATR. In other words, the aggregation target range ATR includes the scanned image from the first scanned image to the second scanned image and the predetermined number of blank images added. Thus, aggregation printing can be properly executed even when the scanned images are insufficient for the number of aggregated images.

In the example of FIG. 5, the first scanned image is the scanned image C and the second scanned image is the scanned image E. The predetermined number corresponding to the insufficiency is 4–3=1. Thus, the processing unit 120 adds one blank image behind the scanned image E and executes print processing using a range including a total of four images, that is, the scanned images C to E and the one blank image for supplement, as the aggregation target range ATR, as shown in the print result P in FIG. 5. For the sake of convenience of the illustration, a plurality of scanned images SI in the state before the interpolation processing with the blank image is shown. In the subsequent drawings, whether a blank image is added or not is similarly shown in the print result PR and therefore a plurality of scanned images SI in the state before interpolation processing with a blank image is shown.

It is assumed that the user attaches a mark to a document. Therefore, when a plurality of marks is attached to one document set, a proper relation between the marks may not be set.

Figure 6:
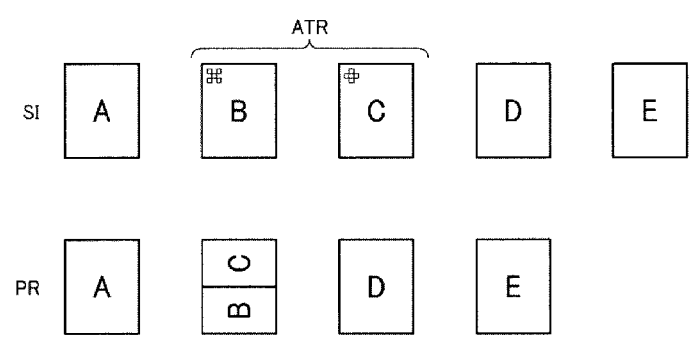
FIG. 6 is an explanatory view where a plurality of marks compete with each other.

FIG. 6 is a specific example where two marks compete with each other. As shown in FIG. 6, the processing unit 120 acquires five scanned images shown as scanned images A to E, as a plurality of scanned images SI, then detects a mark meaning two-image aggregation in the scanned image B, and detects a mark meaning four-image aggregation in the scanned image C. The correspondence between the mark and the number of aggregated images in FIG. 6 is an example. Various other examples can be employed.

In the example of FIG. 6, the processing unit 120 specifies a range including two scanned images with the scanned image B being the start point, as an aggregation target range ATR. The specified aggregation target range ATR includes the scanned image B and the scanned image C. According to the foregoing processing, the processing unit 120 also specifies a range including four scanned images with the scanned image C being the start point, as an aggregation target range ATR. The specified aggregation target range ATR includes the scanned images C to E and a white blank document. When the two aggregation target ranges ATR are specified in this way, the scanned image C is included in the two aggregation target ranges ATR. When both of the two aggregation target ranges ATR are enabled, the scanned image C is printed on two print media in a duplicative manner.

Thus, when a second identifier is detected within an aggregation target range ATR specified based on a first identifier, the processing unit 120 does not specify an aggregation target range based on the second identifier. Thus, a predetermined scanned image can be restrained from being included in a plurality of aggregation target ranges ATR and therefore proper aggregate printing can be carried out.

In the example of FIG. 6, the first identifier is the mark attached to the scanned image B, and the aggregation target range ATR specified based on the first identifier is the range including the scanned image B and the scanned image C. The second identifier is the mark attached to the scanned image C and is detected within the aggregation target range ATR specified based on the first identifier. Therefore, in this case, the processing unit 120 aggregate-prints the scanned image B and the scanned image C, based on the first identifier, as shown in the print result PR in FIG. 6. Since an aggregation target range ATR is not specified based on the mark detected in the scanned image C, the scanned image D and the scanned image E are targets of normal printing, as shown in FIG. 6.

When a plurality of marks attached to one document set do not compete with each other, all of the plurality of marks can be enabled. In other words, the processing unit 120 may specify a plurality of aggregation target ranges ATR based on a plurality of marks, for one document set.

Figure 7:
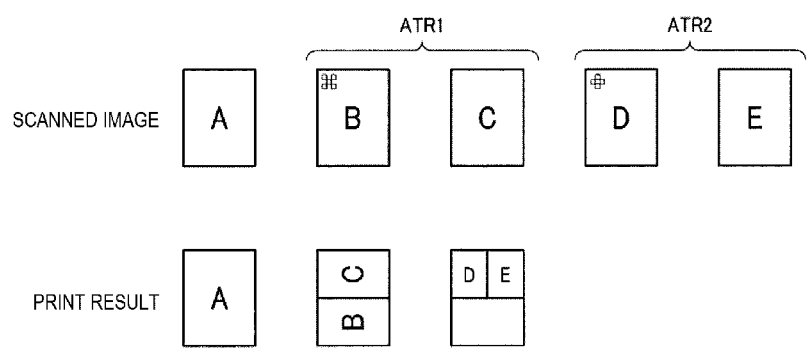
FIG. 7 is an explanatory view where a plurality of marks do not compete with each other.

FIG. 7 is a specific example of specifying a plurality of aggregation target ranges ATR. As shown in FIG. 7, the processing unit 120 acquires five scanned images shown as scanned images A to E, as a plurality of scanned images SI, then detects a mark meaning two-image aggregation in the scanned image B, and detects a mark meaning four-image aggregation in the scanned image D.

In the example of FIG. 7, the processing unit 120 specifies ATR1 that is an aggregation target range ATR including the scanned image B and the scanned image C, based on the mark attached to the scanned image B. The processing unit 120 also specifies ATR2 that is an aggregation target range ATR including the scanned image D, the scanned image E, and two blank images, based on the mark attached to the scanned image D. In this case, another mark is not detected within an aggregation target range ATR specified based on a predetermined mark, and a plurality of marks do not compete with each other. Therefore, the processing unit 120 aggregate-prints the scanned image B and the scanned image C as two-image aggregation and also aggregate-prints the scanned image D and the scanned image E as four-image aggregation, as shown in the print result PR in FIG. 7.

Figure 8:
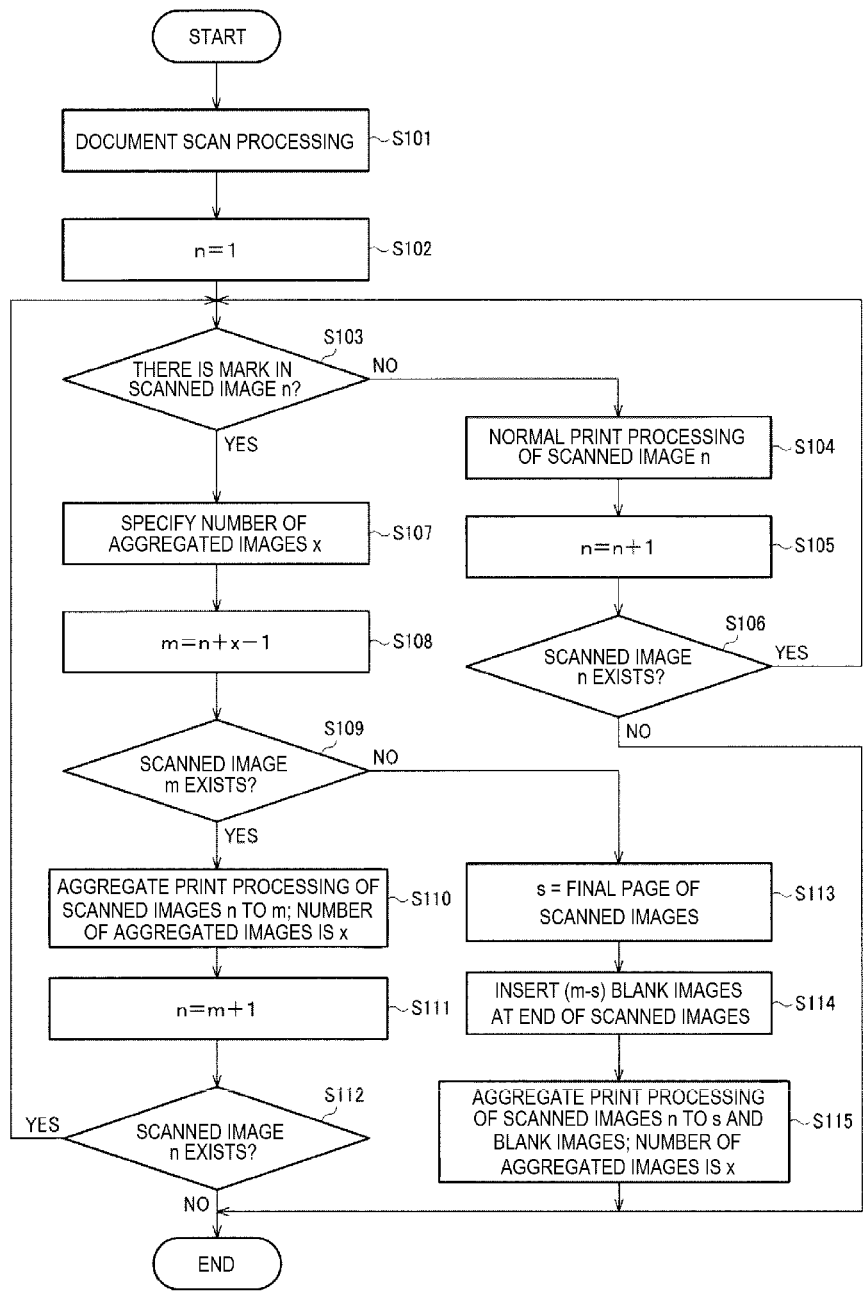
FIG. 8 is a flowchart explaining the processing in the embodiment.

FIG. 8 is a flowchart explaining the foregoing processing. As this processing starts, the processing unit 120 controls the reading unit 110 to perform scan processing to scan a document set (S101). For example, the user places a document set with a mark attached in advance, on a document table, and presses a read button. On detecting the press on the read button, the processing unit 120 performs control to cause the reading unit 110 to execute a reading operation. As the processing according to the embodiment is, for example, print processing of step S102 onward is carried out, after the reading of all the documents of the document set is completed in step S101 and scanned images corresponding to all the documents are acquired. However, the flow of the processing is not limited to this. Scan processing and print processing may be executed in parallel. For example, the processing unit 120 may start the processing of step S102 onward with respect to a scanned image corresponding to a part of the documents of the document set at the point when this scanned image is acquired.

The processing unit 120 initializes a variable n to 1 (S102). Here, n is a variable expressing which ordinal number of document in the document set corresponds to the scanned image that is the processing target. The processing unit 120 determines whether a mark is detected in an n-th scanned image or not (S103). Hereinafter, the n-th scanned image is referred to as the scanned image n. In the processing of step S103 carried out immediately after step S102, the scanned image n is a scanned image corresponding to the document at the beginning.

When there is no mark in the scanned image n (No in step S103), the processing unit 120 performs normal print processing of the scanned image n (S104). Specifically, the processing unit 120 causes the printing unit 130 to execute printing without reducing the scanned image n. This completes the printing of the scanned image n that is the current processing target. Thus, the processing unit 120 changes the scanned image of the processing target to the scanned image immediately behind. Specifically, the processing unit 120 increments n (S105). The processing unit 120 determines whether the scanned image n exists or not (S106). When the scanned image n does not exist (No in step S106), read processing and print processing are complete with respect to all the documents of the document set and therefore the processing unit 120 ends the processing. When the scanned image n exists (Yes in step S106), an unprocessed document is left and therefore the processing unit 120 returns to step S103 and continues the processing.

When there is a mark in the scanned image n (Yes in step S103), the processing unit 120 executes aggregation target range ATR specifying processing and aggregate print processing. First, the processing unit 120 specifies the number of aggregated images (S107). Here, the variable expressing the number of aggregated images is defined as x. As described above, the processing unit 120 may specify the type of the mark to specify the number of aggregated images, or may specify a value set in the electronic apparatus 100 as the number of aggregated images.

The processing unit 120 defines a variable m as $m=n+x-1$ (S108). Here, m is a variable expressing a scanned image corresponding to the end point of the aggregation target range ATR. The aggregation target range ATR in this case includes scanned images in a number equal to the number of aggregated images x. By thus defining the scanned image n as the start point and the scanned image m as the end point, the processing unit 120 can set a proper aggregation target range ATR.

The processing unit 120 determines whether the scanned image m exists or not (S109). When the scanned image m exists (Yes in step S109), the processing unit 120 performs processing to aggregate-print the scanned images n to m by x-image aggregation (S110). This completes the print processing with respect to the scanned images n to m. Therefore, the processing unit 120 changes the scanned image of the processing target to the scanned image immediately behind the scanned image m. Specifically, the processing unit 120 updates n to m+1 (S111). The processing unit 120 determines whether the scanned image n exists or not (S112). When the scanned image n exists (Yes in step S112), the processing unit 120 returns to step S103 and continues the processing. When the scanned image n does not exist (No in step S112), the processing unit 120 ends the processing.

When the scanned image m does not exist (No in step S109), it is equivalent to the case where the scanned images are insufficient for the number of aggregated images, as shown in FIG. 5. Therefore, the processing unit 120 sets a variable s to a value expressing a scanned image corresponding to the final document of the document set (S113). The processing unit 120 inserts blank images in a number corresponding to the insufficiency (m-s) at the end of the scanned images (S114). The processing unit 120 then performs processing to aggregate-print the scanned images n to s and the (m-s) blank images by x-image aggregation (S115). This completes the print processing with respect to the scanned image s, which is the final scanned image. Therefore, the processing unit 120 ends the processing.

As can be understood from steps S108 to S115, the determination about whether there is a mark or not is not executed with the scanned images n to m corresponding to the aggregation target range ATR, except for the scanned image n at the beginning. That is, as shown in FIG. 6, when a plurality of marks compete with each other, the mark behind is ignored.

2.2 Example of Attaching Mark to Start Point and End Point of Aggregation Target Range The processing unit 120 may specify a scanned image including a first mark as the start point of an aggregation target range ATR, specify a scanned image including a second mark as the end point of the aggregation target range ATR, and specify a range from the start point to the end point as the aggregation target range ATR. In this case, the user can cause the electronic apparatus 100 to execute proper aggregate printing by attaching two marks in such a way that documents to be targets of aggregate printing come between these marks. Thus, the aggregation target range ATR can be flexibly changed, and the number of marks attached does not increase when the aggregation target range ATR includes a large number of documents.

When attaching a mark to the start point and the end point, it is not preferable that the number of scanned images included in the aggregation target range ATR is equal to the number of aggregated images. This is because such a limitation impairs the flexibility of the aggregation target range ATR. Therefore, it is desirable that the aggregation target range ATR can be set regardless of the number of aggregated images. The first mark and the second mark are marks attached to different documents from each other. The first mark and the second mark may be of the same type or of different types from each other. The scanned image including the second mark is a scanned image behind the scanned image including the first image.

However, the generation of a blank space in the print result and the number of printed sheets vary, depending on the relation between the number of scanned images included in the aggregation target range ATR and the number of aggregated images. Therefore, for example, the processing unit 120 decides the number of aggregated images based on the number of scanned images included in the aggregation target range ATR. Decision processing of the number of aggregated images will now be described.

The processing unit 120 sets, as the number of aggregated images, a number-of-aggregated-images candidate that can divide the number of scanned images included in the aggregation target range ATR and that has the highest value, of prescribed number-of-aggregated-images candidates. Hereinafter, the number of scanned images included in the aggregation target range ATR is referred to as the number of aggregation targets, where appropriate. The printing unit 130 aggregate-prints the scanned images included in the aggregation target range ATR by the number of aggregated images. For example, it is assumed that $p=q \times r$ is satisfied, where p is the number of aggregation targets and q is the set number of aggregated images. Here, p and q are integers equal to or greater than 2, and r is an integer equal to or greater than 1. In this case, the processing unit 120 reduces each of the p scanned images and creates r image data, each image data being made up of q reduced images aggregated together, and thus generates print data for aggegate printing. Since p is divisible by q, each image data includes q reduced images without exception and therefore the blank space can be reduced. Also, defining q as the largest number-of-aggregated-images candidate can reduce the value of r. That is, the number of printed sheets can be reduced.

Figure 9:
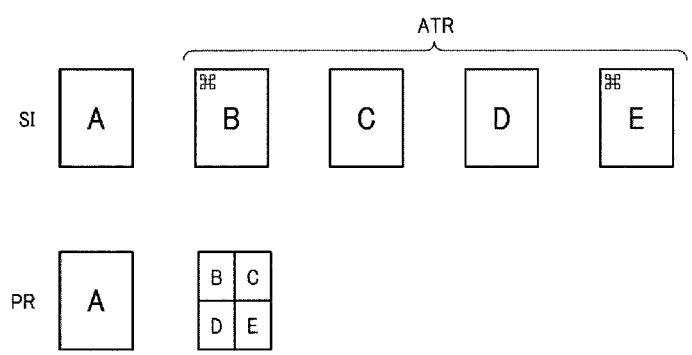
FIG. 9 is an explanatory view of aggregate printing where a mark is attached to the start point and the end point of an aggregation target range.

FIG. 9 is a schematic view of the case where the number of aggregation targets is divisible by one of the number-of-aggregated-images candidates. As shown in FIG. 9, the processing unit 120 acquires five scanned images shown as scanned images A to E, as a plurality of scanned images SI, and detects a mark in the scanned image B and the scanned image E. In this case, the four scanned images B to E are targets of aggregate printing.

The number-of-aggregated-images candidates are 2, 4, and 8. Since 4/8=0.5, the number of aggregation targets is not divisible by 8. That is, when the number of aggregated images is 8, the number of printed sheets is 1 and the scanned images are only present in 50% of the space of the printed sheet. Meanwhile, since 4/4=1, the number of aggregation targets is divisible by 4. That is, when the number of aggregated images is 4, the number of printed sheets is 1 and the blank space is small. Also, since 4/2=2, the number of aggregation targets is divisible by 2. That is, when the number of aggregated images is 2, the blank space is small but the number of printed sheets is 2. Thus, the processing unit 120 selects 4 as the number of aggregated images and aggregate-prints the scanned images B to E by four-image aggregation, as shown in the print result PR in FIG. 9.

Figure 10:
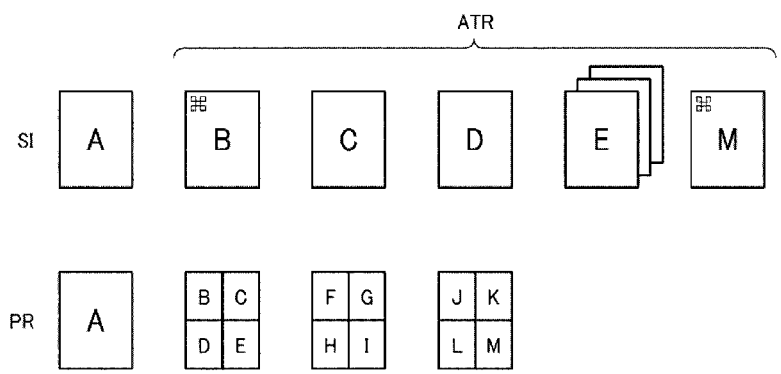
FIG. 10 is an explanatory view of aggregate printing where a mark is attached to the start point and the end point of an aggregation target range.

FIG. 10 is another schematic view of the case where the number of aggregation targets is divisible by one of the number-of-aggregated-images candidates. As shown in FIG. 10, the processing unit 120 acquires 13 scanned images shown as scanned images A to M, as a plurality of scanned images SI, and detects a mark in the scanned image B and the scanned image M. In this case, the 12 scanned images B to M are targets of aggregate printing.

The number-of-aggregated-images candidates that can divide the number of aggregation targets are 2 and 4, and 4 is the largest. Therefore, the processing unit 120 selects 4 as the number of aggregated images and aggregate-prints the scanned images B to M by four-image aggregation, as shown in the print result PR in FIG. 10.

Figure 11:
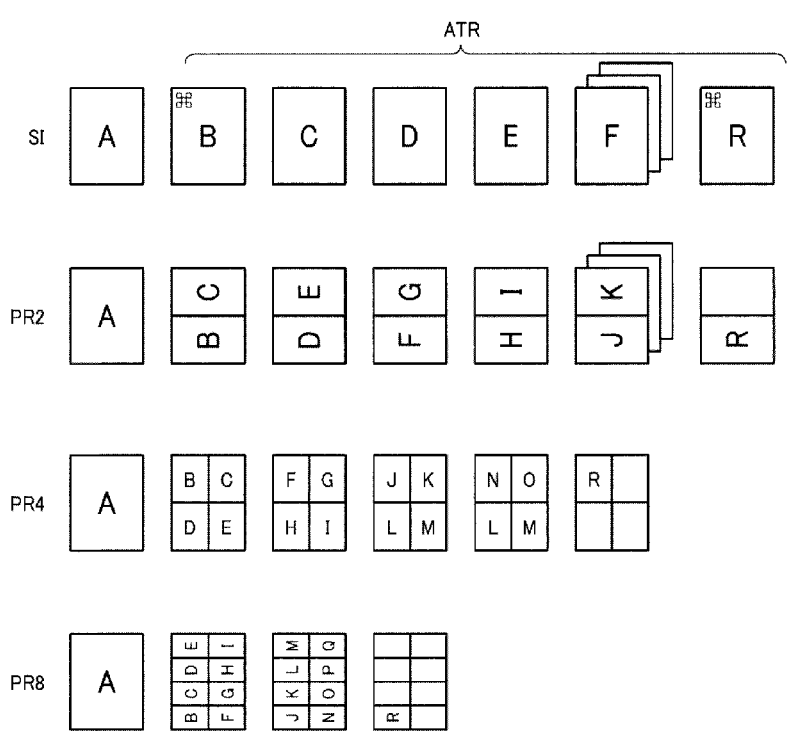
FIG. 11 is an explanatory view of aggregate printing where a mark is attached to the start point and the end point of an aggregation target range.

FIG. 11 is a schematic view explaining an example where the number of aggregation targets is indivisible by any of prescribed number-of-aggregated-images candidates. As shown in FIG. 11, the processing unit 120 acquires 18 scanned images shown as scanned images A to R, as a plurality of scanned images SI, and detects a mark in the scanned image B and the scanned image R. In this case, the 17 scanned images B to R are targets of aggregate printing.

PR2 in FIG. 11 is the print result when the scanned images B to R are aggregate-printed by two-image aggregation. As can be understood from 17/2=8.5, when two-image aggregation is used, the number of printed sheets is nine. On the ninth printed sheet, a reduced image of the scanned image R is placed in 50% of the sheet and the remaining 50% is a blank space.

PR4 in FIG. 11 is the print result when the scanned images B to Rare aggregate-printed by four-image aggregation. As can be understood from 17/4=4.25, when four-image aggregation is used, the number of printed sheets is five. On the fifth printed sheet, a reduced image of the scanned image R is placed in 25% of the sheet and the remaining 75% is a blank space.

PR8 in FIG. 11 is the print result when the scanned images B to R are aggregate-printed by eight-image aggregation. As can be understood from 17/8=2.125, when eight-image aggregation is used, the number of printed sheets is three. On the third printed sheet, a reduced image of the scanned image R is placed in 12.5% of the sheet and the remaining 87.5% is a blank space.

For example, when the number of scanned images included in the aggregation target range ATR is indivisible by any of prescribed number-of-aggregated-images candidates, the processing unit 120 sets, as the number of aggregated images, a number-of-aggregated-images candidate that results in the smallest blank space in the print result, of the number-of-aggregated-images candidates. This can restrain wasting of the space on the print medium. In the example of FIG. 11, the processing unit 120 selects two-image aggregation, which results in the lowest proportion of blank space of 50%.

Alternatively, when the number of scanned images included in the aggregation target range ATR is indivisible by any of prescribed number-of-aggregated-images candidates, the processing unit 120 sets, as the number of aggregated images, a number-of-aggregated-images candidate that results in the smallest number of printed sheets, of the number-of-aggregated-images candidates. This can restrain consumption of the print medium. In the example of FIG. 11, the processing unit 120 selects eight-image aggregation, which results in the smallest number of printed sheets of three.

Figure 12:
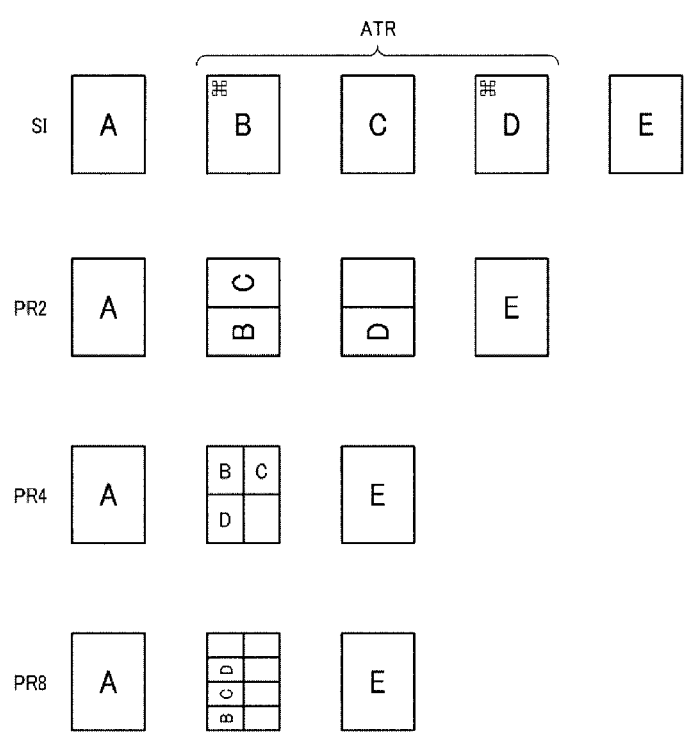
FIG. 12 is an explanatory view of aggregate printing where a mark is attached to the start point and the end point of an aggregation target range.

FIG. 12 is a schematic view explaining another example in the case where the number of aggregation targets is indivisible by any of prescribed number-of-aggregated-images candidates. As shown in FIG. 12, the processing unit 120 acquires five scanned images shown as scanned images A to E, as a plurality of scanned images SI, and detects a mark in the scanned image B and the scanned image D. In this case, the three scanned images B to D are targets of aggregate printing.

The print results of two, four, and eight-image aggregation in this case are shown in PR2, PR4, and PR8 in FIG. 12. Since 3/2=1.5, 3/4=0.75, and 3/8=0.375, the number of printed sheets is one both in eight-image aggregation and in four-image aggregation. When a plurality of number-of-aggregated-images candidates are determined as resulting in the same number of printed sheets, the processing unit 120 sets, as the number of aggregated images, a number-of-aggregated-images candidate that results in the smallest blank space in the print result. In the above example, when eight-image aggregation is used, three reduced images are placed in 37.5% of the sheet and the remaining 62.5% is a blank space. When four-image aggregation is used, three reduced images are placed in 75% of the sheet and the remaining 25% is a blank space. Therefore, the processing unit 120 selects four as the number of aggregated images, which results in a smaller blank space. This can restrain the number of printed sheets and also enables execution of aggregate printing with less waste in consideration of blank space when the number of printed sheets is the same.

The number of aggregated images is not limited to being decided based on the number of scanned images included in the aggregation target range ATR. For example, the printing unit 130 may aggregate-print scanned images included in the aggregation target range ATR by a predetermined number of aggregated images that is set in advance. In other words, the processing unit 120 may specify a predetermined set value as the number of aggregated images regardless of the number of aggregation targets.

Figure 13:
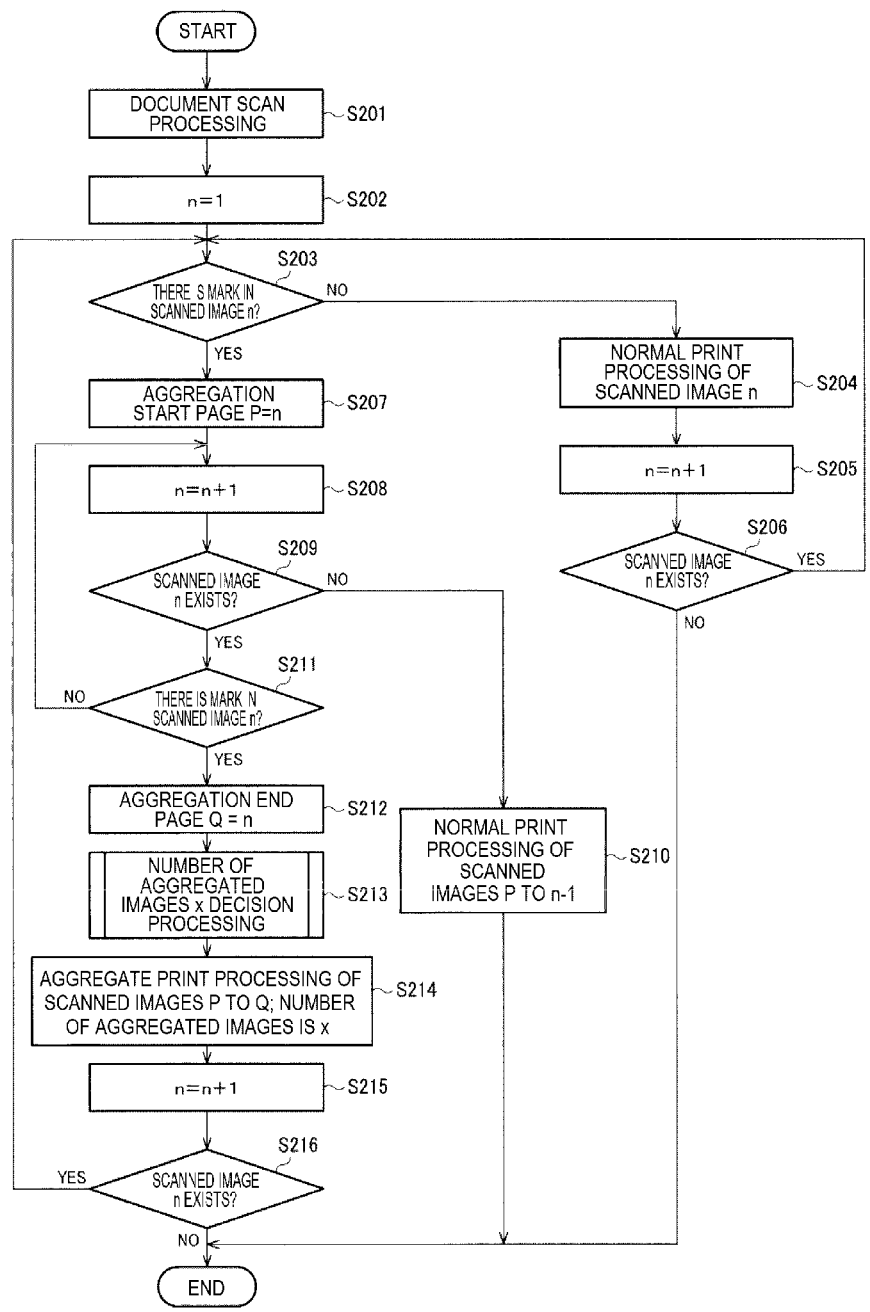
FIG. 13 is another flowchart explaining the processing in the embodiment.

FIG. 13 is a flowchart explaining the above processing. Steps S201 to S206 in FIG. 13 are similar to steps S101 to S106 in FIG. 8 and therefore will not be described further in detail. When there is a mark in the scanned image n (Yes in step S203), the processing unit 120 updates a variable P expressing the start point of the aggregation target range ATR, with the value of n at the time (S208). The processing unit 120 then starts processing to search for the end point of the aggregation target range ATR. Specifically, the processing unit 120 increments n (S208) and determines whether the scanned image n exists or not (S209). When the scanned image n does not exist (No in step S209), it is equivalent to the case where the end point of the aggregation target range ATR is not found even by searching up to the final scanned image.

In the technique of attaching a mark to the start point and the end point of an aggregation target range ATR, one aggregation target range ATR is decided based on two marks. Therefore, the number of marks detected from all the scanned images is an even number. When No in step S209, the number of detected marks is an odd number. In this case, the processing unit 120 does not set an aggregation target range ATR based on the last detected mark. Specifically, the processing unit 120 performs processing to normally print the scanned image P to the scanned image n−1, which is the final scanned image that exists (S210), and ends the processing.

When the scanned image n exists (Yes in step S209), the processing unit 120 determines whether there is a mark in the scanned image n or not (S211). When there is no mark in the scanned image n (No in step S211), the processing unit 120 returns to step S208 and continues searching for the end point of the aggregation target range ATR. When there is a mark in the scanned image n (Yes in step S211), the processing unit 120 specifies the scanned image n as the end point of the aggregation target range ATR. Specifically, the processing unit 120 updates a variable Q expressing the end point of the aggregation target range ATR, with the value of n at the time (S212).

The aggregation target range ATR is thus specified. Therefore, the processing unit 120 performs processing to decide the number of aggregated images x (S213) and performs processing to aggregate-print the scanned images P to Q by x-image aggregation (S214). The processing unit 120 increments n (S215) and determines whether the scanned image n exists or not (S216). When the scanned image n exists (Yes in step S216), the processing unit 120 returns to step S203 and continues the processing. When the scanned image n does not exist (No in step S216), the processing unit 120 ends the processing.

Figure 14:
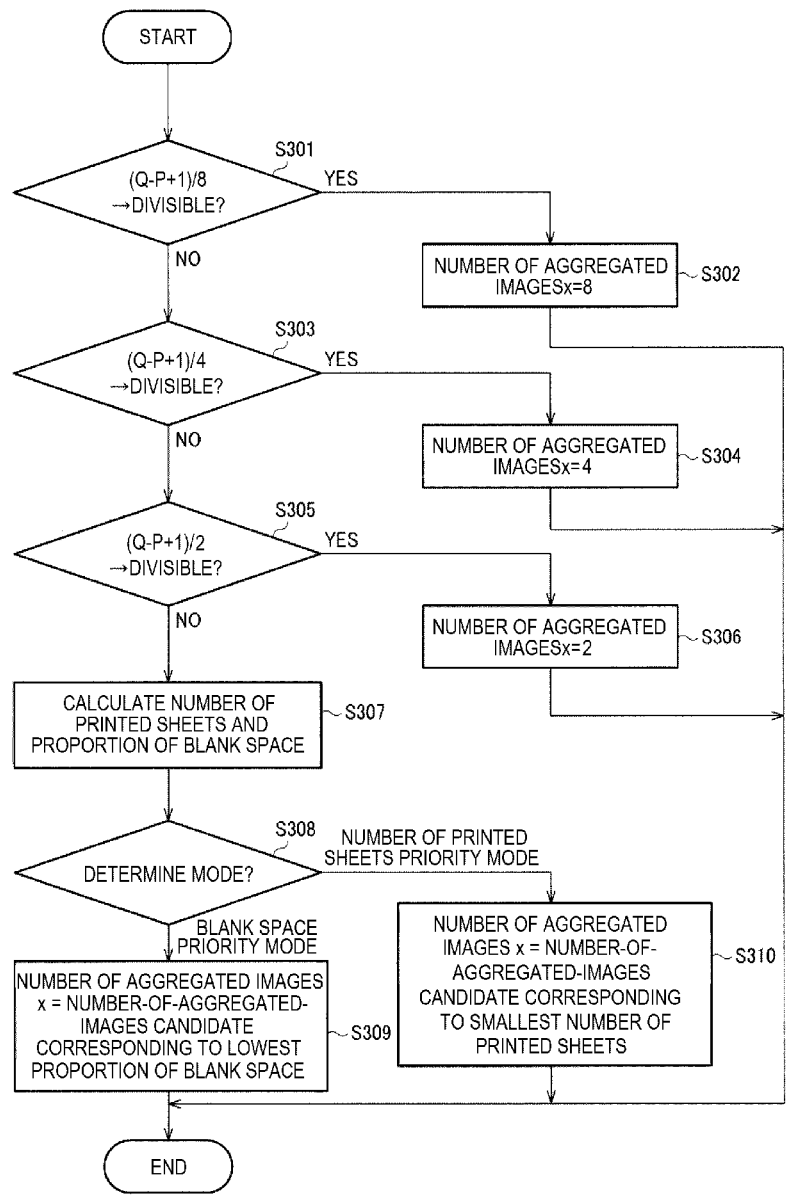
FIG. 14 is a flowchart explaining decision processing of the number of aggregated images.

FIG. 14 is a flowchart explaining the processing of step S213, and specifically, the processing to decide the number of aggregated images based on the number of scanned images included in the aggregation target range ATR. As this processing starts, the processing unit 120 first determines whether or not the number of aggregation targets Q−P+1 is divisible by 8, which is the largest number-of-aggregated-images candidate (S301). When the number of aggregation targets is divisible by 8 (Yes in step S301), the processing unit 120 selects 8 as the number of aggregated images (S302).

When the number of aggregation targets is indivisible by 8 (No in step S301), the processing unit 120 determines whether or not the number of aggregation targets is divisible by 4, which is the next largest number-of-aggregated-images candidate (S303). When the number of aggregation targets is divisible by 4 (Yes in step S303), the processing unit 120 selects 4 as the number of aggregated images (S304).

When the number of aggregation targets is indivisible by 4 (No in step S303), the processing unit 120 determines whether the number of aggregation targets is divisible by 2 or not (S305). When the number of aggregation targets is divisible by 2 (Yes in step S305), the processing unit 120 selects 2 as the number of aggregated images (S306). In this way, determination is carried out about the number-of-aggregated-images candidates in order from the highest value. Thus, a number-of-aggregated-images candidate that can divide the number of aggregation targets and that has the highest value can be set as the number of aggregated images.

When the number of aggregation targets is indivisible by any of the prescribed number-of-aggregated-images candidates (No in step S305), the processing unit 120 calculates the number of printed sheets and the proportion of blank space for each number-of-aggregated-images candidate (S307). The number of printed sheets and the proportion of blank space can be determined based on the result of division, as described above. The number of printed sheets is the value of the result of division with decimals rounded up. The proportion of blank space is (1-decimal part). Alternatively, the processing unit 120 may find the number of printed sheets and the proportion of blank space, based on the quotient and remainder in division.

The processing unit 120 determines the mode of deciding the number of aggregated images (S308). When it is a blank space priority mode, the processing unit 120 decides a candidate that results in the lowest proportion of blank space, of the number-of-aggregated-images candidates, as the number of aggregated images x (S309). When it is a number of printed sheets priority mode, the processing unit 120 decides a candidate that results in the smallest number of printed sheets, of the number-of-aggregated-images candidates, as the number of aggregated images x (S310). When there is a plurality of number-of-aggregated-images candidates that result in the same number of printed sheets, processing to select a candidate that results in the lowest proportion of blank space is added to step S310.

FIG. 14 is an example of the processing of step S213 to decide the number of aggregated images. The specific processing procedure is not limited to this example. Also, a preset value may be used as the number of aggregated images, as described above.

2.3 Mark Detection Area

The user may attach a mark at an arbitrary position on a document. In this case, the processing unit 120 performs mark detection processing on the entirety of a scanned image. However, an area available for attaching a mark may be presented to the user, thus limiting a mark detection target area by the processing unit 120.

For example, the processing unit 120 sets an end area at the side corresponding to the direction of document reading by the reading unit 110, of a scanned image, as a mark detection area. The processing unit 120 then performs mark detection processing in the mark detection area. Thus, the mark detection area can be limited to a part of the scanned image.

Figure 15:
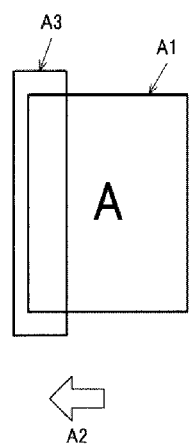
FIG. 15 shows an example of setting a mark detection area.

FIG. 15 shows an example of the mark detection area. A1 in FIG. 15 represents a document reading area of the scanned image. A2 represent the direction corresponding to the document reading direction. The reading direction may be rephrased as a document transport direction. That is, in the example of FIG. 15, the document is read from the left side, and the mark detection area is set to an end area on the left side of the scanned image, as shown by A3. In FIG. 15, it is assumed that a broader area than the document size is the reading target of the reading unit 110.

The mark detection area is set at the end part at the side where data is acquired earlier, of the scanned image. In many cases, no text or image is printed at the end part of the document. Setting the mark detection area shown in FIG. 15 can restrain an overlap between the image or the like originally included in the document and the mark and therefore can improve the accuracy of the mark detection processing. When the image or the like originally included in the document and the mark are sufficiently unlikely to overlap each other, the processing unit 120 can erase the mark by image processing. For example, the processing unit 120 performs processing to blot out the mark with the background color of the document. Thus, the mark for aggregate printing can be eliminated from the print result without damaging the content originally included in the document.

As the mark detection area is set at the end at the side read earlier, the mark detection processing can be executed even before the data of the entire scanned image is acquired. Since the mark detection processing can be started at an early timing, the time required for executing the entire processing including scan processing and print processing can be reduced.

3. Aggregate Printing Using Aggregation Range-Specifying Document

The processing unit 120 may perform processing to detect an aggregation range-specifying document as an identifier, based on the result of scanning, and specify an aggregation target range ATR, based on the identifier. The aggregation range-specifying document is a document used to specify an aggregation range by the processing unit 120 and having a feature distinctive from a normal document. The aggregation range-specifying document is, for example, a plain document having a predetermined background color. When the background color is white, the aggregation range-specifying document is a white blank document. However, the background color is not limited to white. The aggregation range-specifying document may be a color-specified document that has a specified color and is plain. Also, the aggregation range-specifying document is not limited to a plain document and may be a document with a specified pattern printed thereon.

Thus, an aggregation target range ATR can be specified using the aggregation range-specifying document. The user inserts the aggregation range-specifying document into a document set apart from a document that is a target of reading and printing. Therefore, strain and damage to the document can be restrained, compared with the example of attaching a mark. Also, using a white blank document as the aggregation range-specifying document is advantageous in that it is easily available.

3.1 Example of Inserting Aggregation Range-Specifying Document at Start Point of Aggregation Target Range The processing unit 120 specifies a scanned image that is the start point of an aggregation target range ATR, based on an identifier. The processing unit 120 then specifies a final scanned image of scanned images in a predetermined number of aggregated images where the foregoing specified scanned image is the start point, as the end point of the aggregation target range ATR, and specifies the range from the start point to the end point as the aggregation target range ATR. When the identifier is the aggregation range-specifying document, the processing unit 120 specifies a scanned image subsequent to a scanned image determined as the aggregation range-specifying document by detection processing, as the start point of the aggregation target range ATR. The printing unit 130 aggregate-prints the scanned images by the number of aggregated images specified as the aggregation target range ATR, on one print medium. Thus, a predetermined number of scanned images where a scanned image subsequent to the aggregation range-specifying document is the start point can be aggregate-printed on one print medium.

Figure 16:
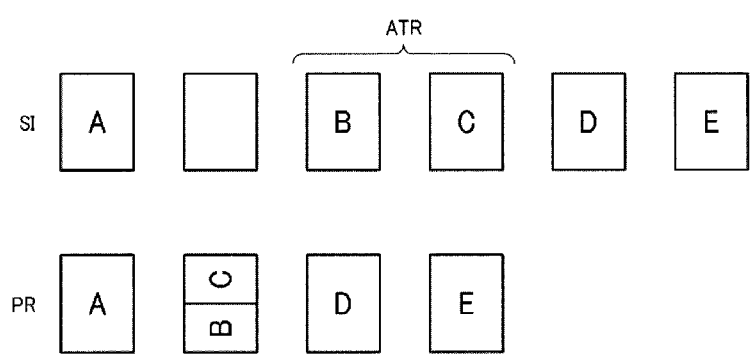
FIG. 16 is an explanatory view of aggregate printing where an aggregation range-specifying document is inserted at the start point of an aggregation target range.

In the example of FIG. 16, the reading unit 110 acquires six scanned images shown as a scanned image A, a scanned image corresponding to the aggregation range-specifying document, and scanned images B to E, as a plurality of scanned images SI. The user has inserted the aggregation range-specifying document as the second document in the document set. In FIG. 16, an example where a black document is used as the aggregation range-specifying document is explained. The same applies to FIG. 18, described later.

The processing unit 120 performs determination processing to determine whether each of the acquired scanned images is an image corresponding to the aggregation range-specifying document or not. When the aggregation range-specifying document is plain, the scanned image is expected to be an image having the same pixel value over its entirety. Therefore, the processing unit 120 determines whether the scanned image is the aggregation range-specifying document or not, by comparing the expected pixel value with the actual pixel value of the scanned image. When the aggregation range-specifying document is an image with a specified pattern printed thereon, the processing unit 120 determines whether the scanned image is the aggregation range-specifying document or not, using template matching or the like, as in the example of the mark.

When the start point of the aggregation target range ATR is specified based on the aggregation range-specifying document, it is desirable that the number of scanned images included in the aggregation target range ATR is equalized with the number of aggregated images, as in the example of the mark. The number of aggregated images is, for example, a value decided based on the type of the identifier. When a plurality of aggregation range-specifying documents are used, the identifier is an aggregation range-specifying document, and the type of the aggregation range-specifying document and the number of aggregated images are associated with each other. For example, when a white blank document is detected, the processing unit 120 determines that it is N-image aggregation. When a document with a specified pattern is detected, the processing unit 120 determines that it is M-image aggregation. Alternatively, the number of aggregated images may be a preset value. For example, the number of aggregated images is set to a predetermined value in advance using the operation interface of the electronic apparatus 100, and the processing unit 120 performs processing using this number of aggregated images.

FIG. 16 shows an example where the number of aggregated images is two. Therefore, the processing unit 120 specifies an aggregation target range ATR including the scanned image B and the scanned image C. The printing unit 130 aggregate-prints the scanned image B and the scanned image C by two-image aggregation. As shown in the print result PR in FIG. 16, the scanned image as the result of scanning the aggregation range-specifying document is not included in the aggregation target range ATR and is not a target of printing, either.

When the aggregation range-specifying document is used, various kinds of processing can be carried out as in the case where a mark is used. For example, when the number of images from a first scanned image, which is the scanned image specified as the start point based on an identifier, to a second scanned image, which is the final scanned image, is insufficient for the number of aggregated images by a predetermined number of images, the processing unit 120 performs supplement processing to supplement the insufficiency with the predetermined number of blank images. For example, when the number of aggregated images is set to four but there are only three scanned images behind the aggregation range-specifying document, the processing unit 120 performs processing to add one blank image at the end.

Alternatively, when a second identifier is detected within an aggregation target range ATR specified based on a first identifier, the processing unit 120 does not specify an aggregation target range ATR based on the second identifier. For example, it is assumed that the number of aggregated images is set to four, and that after an aggregation range-specifying document is detected and before four scanned images that are not aggregation range-specifying documents appear, the next aggregation range-specifying document is detected. In this case, the processing unit 120 does not set an aggregation target range ATR based on the second aggregation range-specifying document.

Figure 17:
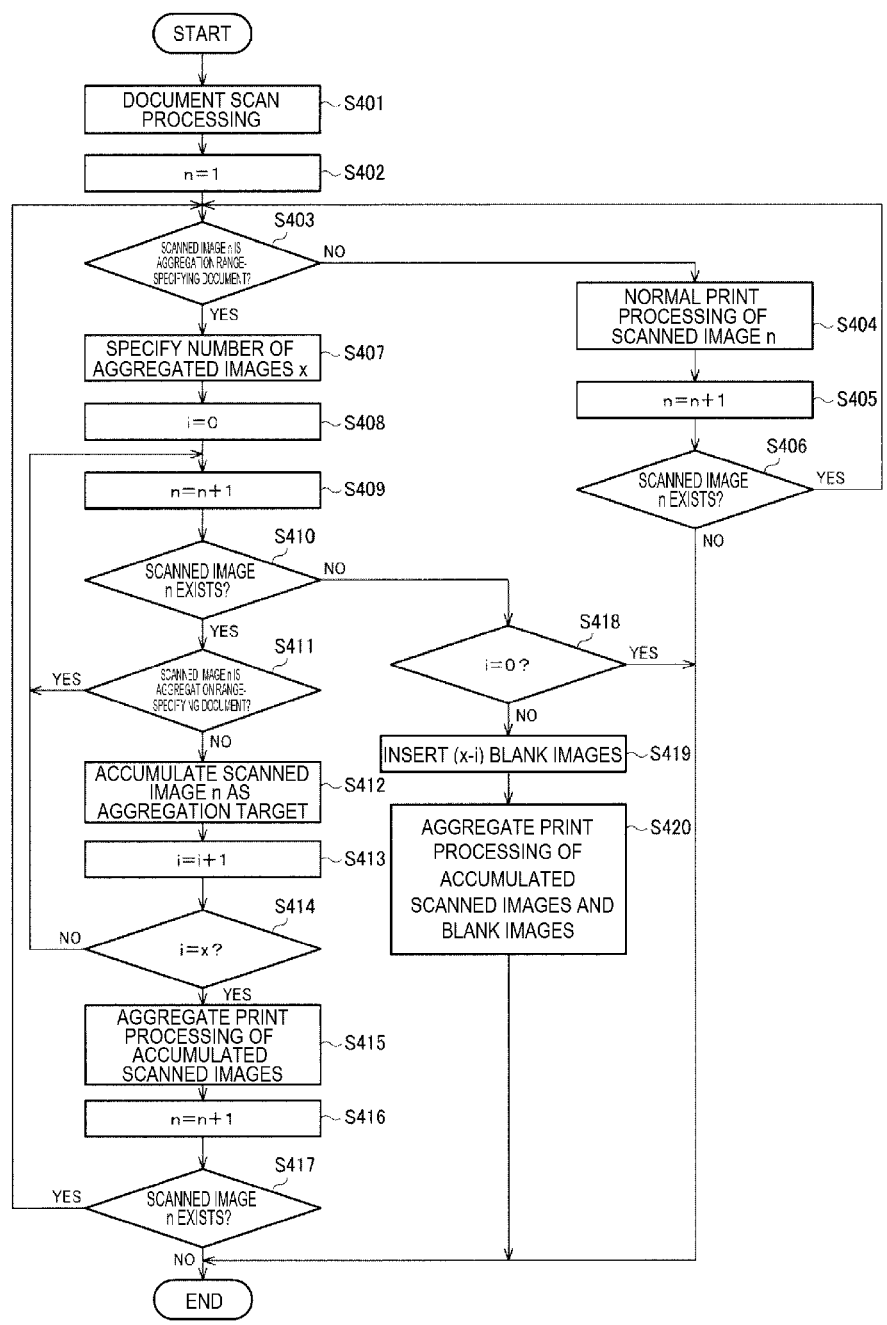
FIG. 17 is another flowchart explaining the processing in the embodiment.

FIG. 17 is a flowchart explaining the above processing. Steps S401 to S406 are similar to steps S101 to S106 in FIG. 8, except that the processing of step S403 is changed to determination about whether the scanned image n is an aggregation range-specifying document or not. Therefore, these steps will not be described further in detail.

When the scanned image n corresponds to an aggregation range-specifying document (Yes in step S403), the processing unit 120 executes aggregation target range ATR specifying processing and aggregate print processing. First, the processing unit 120 specifies the number of aggregated images x (S407). As described above, the processing unit 120 may specify the number of aggregated images by specifying the type of the aggregation range-specifying document, or may specify a value set in the electronic apparatus 100 as the number of aggregated images.

The processing unit 120 initializes a variable i to 0 (S408). Here, i is a variable expressing the number of documents that exist after an aggregation range-specifying document and that are not aggregation range-specifying documents. The processing unit 120 increments n (S409) and determines whether the scanned image n exists or not (S410). When the scanned image n exists (Yes in step S410), the processing unit 120 determines whether the scanned image n is an aggregation range-specifying document or not (S411).

When the scanned image n is not an aggregation range-specifying document (No in step S411), the processing unit 120 accumulates the scanned image n as an aggregation target (S412) and increments i (S413). Next, the processing unit 120 determines whether scanned images in a number corresponding to the number of aggregated images x are accumulated or not. Specifically, the processing unit 120 determines whether i=x or not (S414). When No in step S414, the processing unit 120 returns to step S409 and continues the processing of a scanned image behind. Meanwhile, when the scanned image n is an aggregation range-specifying document (Yes in step S411), this aggregation range-specifying document is ignored. When Yes in step S411, the processing unit 120 returns to step S409 without performing the processing of steps S412 to S414.

When i=x, that is, when scanned images in a number corresponding to the number of aggregated images x are accumulated (Yes in step S414), the processing unit 120 performs processing to aggregate-print the accumulated x scanned images, using x-image aggregation (S415). Subsequently, the processing unit 120 increments n (S416) and determines whether the scanned image n exists or not (S417). When the scanned image n exists (Yes in step S417), the processing unit 120 returns to step S403 and continues the processing. When the scanned image n does not exist (No in step S417), the processing unit 120 ends the processing.

When it is determined that the scanned image n does not exist during the accumulation of scanned images to be targets of aggregate printing (No in step S410), it is equivalent to the case where the scanned images are insufficient for the number of aggregated images. In this case, the processing unit 120 first determines whether i=0 or not (S418). When i=0 (Yes in step S418), no document exists behind the aggregation range-specifying document and therefore the processing unit 120 ends the processing.

When i≠0 (No in step S418), scanned images that are aggregation targets are accumulated but the number of these scanned images has not reached the number of aggregated images. Therefore, the processing unit 120 inserts (x-i) blank images to fill the insufficiency, at the end of the scanned images (S419). The processing unit 120 then performs processing to aggregate-print the accumulated i scanned images and the (x-i) blank images by x-image aggregation (S420). This completes the print processing with respect to the final scanned image. Therefore, the processing unit 120 ends the processing.

3.2 Example of Inserting Aggregation Range-Specifying Document at Start Point and End Point of Aggregation Target Range Also, the processing unit 120 may specify a scanned image subsequent to a scanned image determined as a first aggregation range-specifying document by detection processing, as the start point of an aggregation target range ATR, and may specify a scanned image immediately preceding a scanned image determined as a second aggregation range-specifying document by detection processing, as the end point of the aggregation target range ATR. This enables flexible setting of an aggregation target range ATR, using aggregation range-specifying documents. The first aggregation range-specifying document is an aggregation range-specifying document inserted ahead of the second aggregation range-specifying document. The first aggregation range-specifying document and the second aggregation range-specifying document may be of the same type or of different types from each other.

Figure 18:
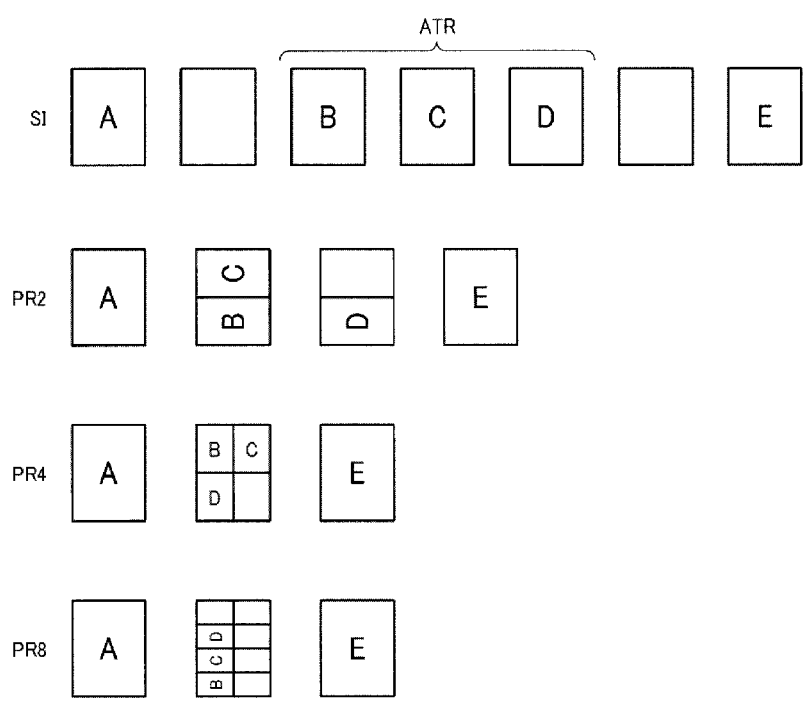
FIG. 18 is an explanatory view of aggregate printing where an aggregation range-specifying document is inserted at the start point and the end point of an aggregation target range.

FIG. 18 is a schematic view showing the case where the start point and the endpoint of an aggregation target range ATR are specified, using aggregation range-specifying documents. As shown in FIG. 18, the processing unit 120 acquires seven scanned images in total, that is, scanned images A to E and scanned images corresponding to two aggregation range-specifying documents, as a plurality of scanned images SI. The scanned images corresponding to the aggregation range-specifying documents are detected between the scanned image A and the scanned image B and between the scanned image D and the scanned image E. In this case, the three scanned images B to D are targets of aggregate printing.

The processing unit 120 may decide the number of aggregated images, based on the number of scanned images included in the aggregation target range ATR. For example, the processing unit 120 decides the number of aggregated images, based on the processing described with reference to FIG. 14. Alternatively, the printing unit 130 may aggregate-print scanned images included in the aggregation target range ATR, in a predetermined number of aggregated images set in advance. In other words, the processing unit 120 may specify a predetermined set value as the number of aggregated images, regardless of the number of aggregation targets.

Figure 19:
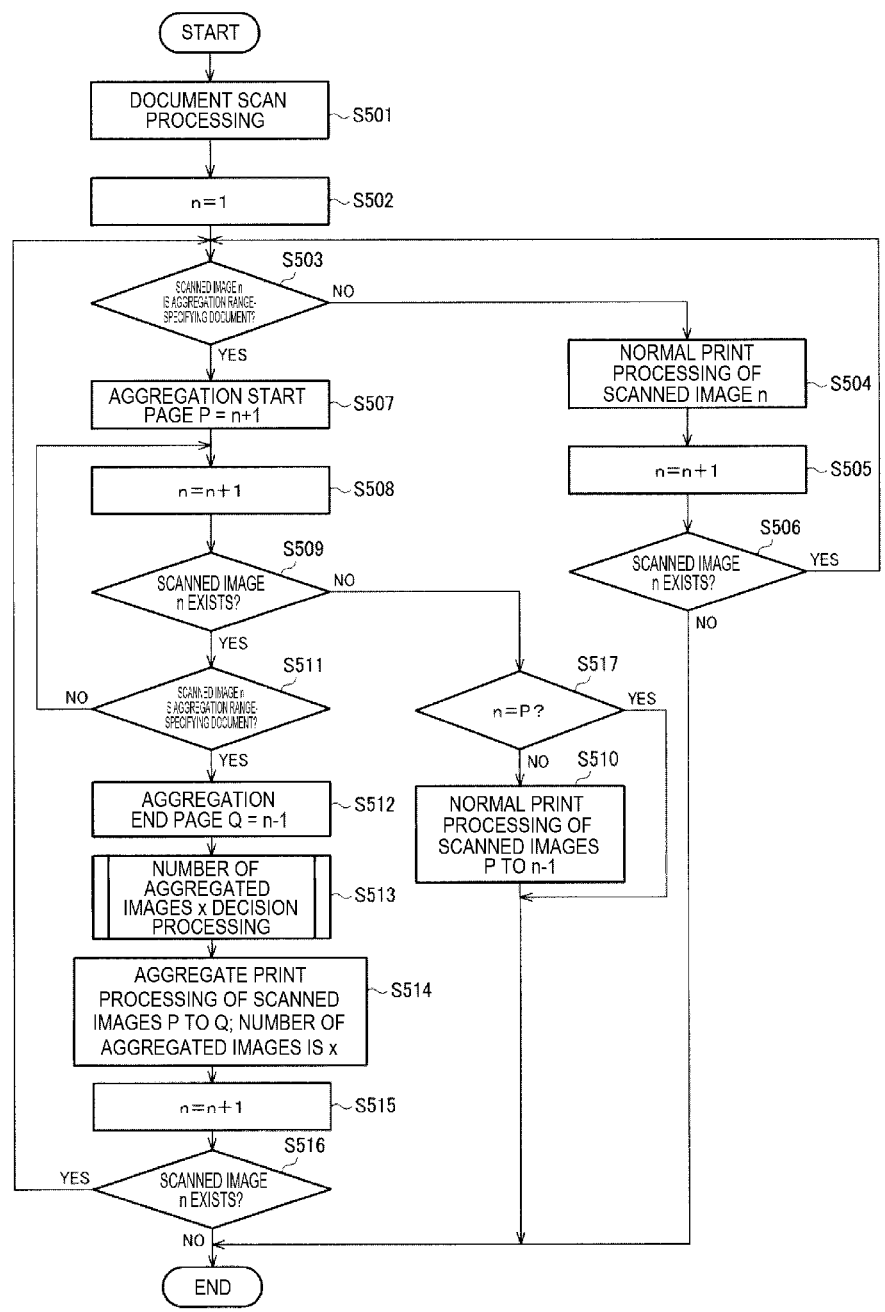
FIG. 19 is another flowchart explaining the processing in the embodiment.

FIG. 19 is a flowchart explaining the above processing. The processing of FIG. 19 is similar to the processing of FIG. 13, where a mark is used. Therefore, differences from FIG. 13 will now be described. In FIG. 19, the determination about whether there is a mark in the scanned image n or not (S203, S211) is changed to the determination about whether the scanned image n is an aggregation range-specifying document or not (S503, S511).

The processing unit 120 updates a variable P expressing the start point of the aggregation target range ATR, with the value of n+1 instead of n at the time (S507). The reason for using P=n+1 instead of P=n is that the aggregation range-specifying document itself is not a target of aggregate printing and that the aggregation target range ATR starts with the scanned image subsequent to the aggregation range-specifying document. The processing unit 120 also updates a variable Q expressing the endpoint of the aggregation target range ATR, with the value of n−1 instead of n at the time (S512). The reason for using Q=n−1 instead of Q=n is that the aggregation range-specifying document itself is not a target of aggregate printing and that the aggregation target range ATR ends with the scanned image preceding the aggregation range-specifying document.

When the final scanned image corresponds to the first aggregation range-specifying document, the scanned image P, which is the start point of the aggregation target range ATR, does not exist. In this case, there is no scanned image to be a target of normal printing in step S510 and therefore the processing of step S510 need not be executed. Thus, as shown in FIG. 19, when No in step S509, the processing unit 120 determines whether n=P or not (S517). When n=P (Yes in step S517), the processing unit 120 ends the processing. When n≠P (No in step S517), there is a scanned image to be a target of normal printing behind the aggregation range-specifying document. Therefore, the processing unit 120 executes the processing of step S510 and subsequently ends the processing.

3.3 Double-Sided Reading

The reading unit 110 may be able to execute single-side scanning and double-sided scanning. Single-sided scanning is processing to read one side corresponding to the front side of a reading target document. Double-sided scanning is processing to read both of the front and back sides of a reading target document.

When double-sided scanning is carried out and a white blank document is used as an aggregation range-specifying document, the detection processing by the processing unit 120 needs attention. This is because normal documents that are not aggregation range-specifying documents can include a document with a text, image or the like printed only on one side. When a single-side printed document is a target of double-sided scanning, for example, a scanned image corresponding to the back side has entirely white image data, similarly to a scanned image of a white blank document. When this scanned image is determined as an aggregation range-specifying document, an aggregation target range ATR different from the user's intention is specified.

Thus, when double-sided scanning is carried out, the processing unit 120 performs processing to detect an aggregation range-specifying document, based on both of the scanned image of the front side and the scanned image of the back side. In the example using a white blank document, the processing unit 120 executes aggregation target range ATR specifying processing when both of the scanned image of the front side and the scanned image of the back side are blank images. Thus, a proper aggregation target range ATR based on the aggregation range-specifying document can be specified even when double-sided scanning is carried out.

4. Program and Like

The processing unit 120 of the electronic apparatus 100 in the embodiment may be implemented as a module of a program operating on a processor. For example, the program includes a reading control module, an image processing module, and a print control module. The reading control module controls the reading unit 110 to perform processing to scan a reading target and acquire a plurality of scanned images SI. The image processing module performs processing to specify an aggregation target range ATR to be a target of aggregate printing, of the plurality of scanned images SI, based on the plurality of scanned images SI as the result of scanning by the reading unit 110. The print control module controls the printing unit 130 to perform processing to aggregate-print the scanned images specified as the aggregation target range ATR, of the plurality of scanned images SI.

The program implementing the processing carried out by the processing unit 120 of the electronic apparatus 100 in the embodiment can be stored in an information storage medium that is, for example, a computer-readable medium. The information storage medium can be implemented, for example, as an optical disk, memory card, HDD (hard disk drive), or semiconductor memory. The semiconductor memory is, for example, a ROM (read-only memory). The processing unit 120 performs the various kinds of processing in the embodiment, based on a program and data stored in the information storage medium. That is, a program for causing a computer to function as each part of the electronic apparatus 100 in the embodiment is stored in the information storage medium. The computer is a device having an input device, a processing unit, a storage unit, and an output unit. The program is a program for causing the computer to execute the processing by each part. The program is recorded in the information storage medium.

The technique in the embodiment can be applied to an image processing method executing a part or all of the processes shown in FIGS. 8, 13, 14, 17, and 19, a method for controlling the electronic apparatus 100, and a method for operating the electronic apparatus 100. The image processing method according to the embodiment includes: acquiring a plurality of scanned images SI as a result of scanning a reading target by the reading unit 110; specifying an aggregation target range ATR which is a target of aggregate printing, of the plurality of scanned images SI, based on the plurality of scanned images SI as the result of scanning; and outputting image data for aggregate printing made up of the scanned images specified as the aggregation target range ATR and aggregated together.

As described above, the electronic apparatus in the embodiment includes a reading unit, a processing unit, and a printing unit. The reading unit scans a reading target and acquires a plurality of scanned images. The processing unit performs processing to specify an aggregation target range which is a target of aggregate printing, of the plurality of scanned images, based on the plurality of scanned images as a result of the scanning by the reading unit. The printing unit aggregate-prints the scanned images specified as the aggregation target range, of the plurality of scanned images.

The technique in the embodiment carries out aggregate printing of an aggregation target range, of a plurality of scanned images. That is, a target range of aggregate printing can be flexibly set. Also, since an aggregation target range is set based on the result of scanning, there is no need to force the user to carry out the work of separating jobs according to documents or the like. This can improve convenience.

In the embodiment, the processing unit may perform processing to detect an aggregation range-specifying document or a predetermined mark as an identifier, based on the plurality of scanned images, and specify the aggregation target range based on the identifier.

Thus, an aggregation target range can be specified based on an identifier.

In the embodiment, the processing unit may specify the scanned image that is a start point of the aggregation target range, based on the identifier, specify the scanned image that is a final one of the scanned images in a predetermined number of aggregated images where the specified scanned image is a start point, as an end point of the aggregation target range, and specify a range from the start point to the end point as the aggregation target range.

Thus, with an identifier provided at the start point, an aggregation target range can be properly specified.

In the embodiment, the number of aggregated images may be a value decided based on a type of the identifier, or a preset value.

Thus, the number of aggregated images, which is the number of scanned images printed on one print medium, can be properly set.

In the embodiment, when a number of images from a first scanned image that is the scanned image specified as the start point based on the identifier to a second scanned image that is the final scanned image is insufficient for the number of aggregated images by a predetermined number, the processing unit may perform supplement processing to add the predetermined number of blank images behind the second scanned image. The processing unit may specify a range where the first scanned image is the start point and where the blank image that is a final one of the predetermined number of blank images is the end point, as the aggregation target range.

Thus, aggregate printing can be properly executed even when the scanned images are fewer than the number of aggregated images.

In the embodiment, when a second identifier is detected within the aggregation target range specified based on a first identifier, the processing unit may not specify the aggregation target range based on the second identifier.

Thus, aggregate printing can be properly executed even when a plurality of identifiers compete with each other.

In the embodiment, the identifier may be the mark. The processing unit may specify the scanned image including a first mark as a start point of the aggregation target range, specify the scanned image including a second mark as an end point of the aggregation target range, and specify a range from the start point to the end point as the aggregation target range.

Thus, with a mark that is an identifier provided at the start point and the end point, an aggregation target range can be properly specified.

In the embodiment, the identifier may be the aggregation range-specifying document. The processing unit may specify the scanned image subsequent to the scanned image determined as a first aggregation range-specifying document by the detection processing, as a start point of the aggregation target range, specify the scanned image preceding the scanned image determined as a second aggregation range-specifying document by the detection processing, as an end point of the aggregation target range, and specify a range from the start point to the end point as the aggregation target range.

Thus, with an aggregation range-specifying document that is an identifier inserted at positions corresponding to the start point and the end point, an aggregation target range can be properly specified.

In the embodiment, the processing unit may set a number-of-aggregated-images candidate that can divide the number of the scanned images included in the aggregation target range and that has a highest value, of prescribed number-of-aggregated-images candidates, as a number of aggregated images. The printing unit may aggregate-print the scanned images included in the aggregation target range by the number of aggregated images.

Thus, a proper number of aggregated images can be set based on the number of scanned images included in an aggregation target range.

In the embodiment, when the number of the scanned images included in the aggregation target range is indivisible by any of the number-of-aggregated-images candidates, the processing unit may set the number-of-aggregated-images candidate that results in a smallest blank space in a print result, of the number-of-aggregated-images candidates, as the number of aggregated images. The printing unit may aggregate-print the scanned images included in the aggregation target range by the number of aggregated images.

Thus, a proper number of aggregated images can be set, based on the number of scanned images included in an aggregation target range.

In the embodiment, when the number of the scanned images included in the aggregation target range is indivisible by any of the number-of-aggregated-images candidates, the processing unit may set the number-of-aggregated-images candidate that results in a smallest number of printed sheets, of the number-of-aggregated-images candidates, as the number of aggregated images. When there is a plurality of the number-of-aggregated-images candidates determined as resulting in an equal number of printed sheets, the processing unit may set the number-of-aggregated-images candidate that results in a smallest blank space in a print result, as the number of aggregated images. The printing unit may aggregate-print the scanned images included in the aggregation target range by the number of aggregated images.

Thus, a proper number of aggregated images can be set, based on the number of scanned images included in an aggregation target range.

In the embodiment, the printing unit may aggregate-print the scanned images included in the aggregation target range by a predetermined number of aggregated images that is set in advance.

Thus, a predetermined set value can be used as the number of aggregated images.

In the embodiment, the identifier may be the mark. The processing unit may set an end area at a side corresponding to a document reading direction by the reading unit, of the scanned image, as a mark detection area, and perform detection processing of the mark in the mark detection area.

Thus, a mark detection area can be limited to a part of the area of a scanned image. This can increase the mark detection accuracy and reduce the processing time.

The program in the embodiment causes a computer to execute: processing to acquire a plurality of scanned images as a result of scanning a reading target by a reading unit; processing to specify an aggregation target range which is a target of aggregate printing, of the plurality of scanned images, based on the plurality of scanned images; and processing to output image data for aggregate printing made up of the scanned images specified as the aggregation target range.

The image processing method in the embodiment includes: processing to acquire a plurality of scanned images as a result of scanning a reading target by a reading unit; processing to specify an aggregation target range which is a target of aggregate printing, of the plurality of scanned images, based on the plurality of scanned images; and processing to output image data for aggregate printing made up of the scanned images specified as the aggregation target range.

The embodiment is described in detail above. However, a person skilled in the art can readily understand that various modifications can be made without substantially departing from the new matters and effects of the disclosure. Therefore, all such modifications are included in the scope of the disclosure. For example, a term described along with a different term having a broader meaning or the same meaning, at least once in the specification or drawings, can be replaced with the different term at any point in the specification or drawings. Also, all the combinations of the embodiment and modifications are included in the scope of the disclosure. The configuration and operation of the electronic apparatus are not limited to those described and can be implemented with various modifications.

What is claimed is:

1. An electronic apparatus comprising:
a reading unit scanning a reading target and acquiring a plurality of scanned images;
a processing unit performing processing to specify an aggregation target range which is a target of aggregate printing, of the plurality of scanned images, based on at least a predetermined mark placed on the plurality of scanned images as a result of the scanning by the reading unit, the predetermined mark comprising an instruction to aggregate; and
a printing unit aggregate-printing the scanned images specified as the aggregation target range, of the plurality of scanned images, wherein the predetermined mark is a specified shape pattern, a color pattern, or a combination of specified shape pattern and color pattern.

2. The electronic apparatus according to claim 1, wherein the processing unit specifies the scanned image that is a start point of the aggregation target range, based on the predetermined mark, specifies the scanned image that is a final one of the scanned images in a predetermined number of aggregated images where the specified scanned image is a start point, as an end point of the aggregation target range, and specifies a range from the start point to the end point as the aggregation target range.

3. The electronic apparatus according to claim 2, wherein the number of aggregated images is a value decided based on a type of the predetermined mark, or a preset value.

4. The electronic apparatus according to claim 2, wherein when a number of images from a first scanned image that is the scanned image specified as the start point based on the predetermined mark to a second scanned image that is the final scanned image is insufficient for the number of aggregated images by a predetermined number, the processing unit performs supplement processing to add the predetermined number of blank images behind the second scanned image, and the processing unit specifies a range where the first scanned image is the start point and where the blank image that is a final one of the predetermined number of blank images is the end point, as the aggregation target range.

5. The electronic apparatus according to claim 2, wherein when a second predetermined mark is detected within the aggregation target range specified based on the predetermined mark, the processing unit does not specify the aggregation target range based on the second predetermined mark.

6. The electronic apparatus according to claim 1, wherein the processing unit specifies the scanned image including the predetermined mark as a start point of the aggregation target range, specifies the scanned image including a second predetermined mark as an end point of the aggregation target range, and specifies a range from the start point to the end point as the aggregation target range.

7. The electronic apparatus according to claim 6, wherein the processing unit sets a number-of-aggregated-images candidate that can divide the number of the scanned images included in the aggregation target range and that has a highest value, of prescribed number-of-aggregated-images candidates, as a number of aggregated images, and the printing unit aggregate-prints the scanned images included in the aggregation target range by the number of aggregated images.

8. The electronic apparatus according to claim 7, wherein when the number of the scanned images included in the aggregation target range is indivisible by any of the number-of-aggregated-images candidates, the processing unit sets the number-of-aggregated-images candidate that results in a smallest blank space in a print result, of the number-of-aggregated-images candidates, as the number of aggregated images, and the printing unit aggregate-prints the scanned images included in the aggregation target range by the number of aggregated images.

9. The electronic apparatus according to claim 7, wherein when the number of the scanned images included in the aggregation target range is indivisible by any of the number-of-aggregated-images candidates, the processing unit sets the number-of-aggregated-images candidate that results in a smallest number of printed sheets, of the number-of-aggregated-images candidates, as the number of aggregated images, when there is a plurality of the number-of-aggregated-images candidates determined as resulting in an equal number of printed sheets, the processing unit sets the number-of-aggregated-images candidate that results in a smallest blank space in a print result, as the number of aggregated images, and the printing unit aggregate-prints the scanned images included in the aggregation target range by the number of aggregated images.

10. The electronic apparatus according to claim 1, wherein the processing unit sets an end area at a side corresponding to a document reading direction by the reading unit, of the scanned image, as a predetermined mark detection area, and performs detection processing of the predetermined mark in the mark detection area.

11. An electronic apparatus comprising:

a reading unit scanning a reading target and acquiring a plurality of scanned images;

a processing unit performing processing to specify an aggregation target range which is a target of aggregate printing, of the plurality of scanned images, based at least on an aggregation range-specifying document image in the plurality of scanned images as a result of the scanning by the reading unit; and a printing unit aggregate-printing the scanned images specified as the aggregation target range, of the plurality of scanned images, wherein the printing unit prints the plurality of scanned images without the aggregation range-specifying document image.

12. The electronic apparatus according to claim 11, wherein the processing unit specifies the scanned image that is a start point of the aggregation target range, based on the aggregation range-specifying document image, specifies the scanned image that is a final one of the scanned images in a predetermined number of aggregated images where the specified scanned image is a start point, as an end point of the aggregation target range, and specifies a range from the start point to the end point as the aggregation target range.

13. The electronic apparatus according to claim 12, wherein the number of aggregated images is a value decided based on a type of the aggregation range-specifying document image, or a preset value.

14. The electronic apparatus according to claim 12, wherein when a number of images from a first scanned image that is the scanned image specified as the start point based on the aggregation range-specifying document image to a second scanned image that is the final scanned image is insufficient for the number of aggregated images by a predetermined number, the processing unit performs supplement processing to add the predetermined number of blank images behind the second scanned image, and the processing unit specifies a range where the first scanned image is the start point and where the blank image that is a final one of the predetermined number of blank images is the end point, as the aggregation target range.

15. The electronic apparatus according to claim 12, wherein when a second aggregation range-specifying document image is detected within the aggregation target range specified based on the aggregation range-specifying document image, the processing unit does not specify the aggregation target range based on the second aggregation range-specifying document image.

16. The electronic apparatus according to claim 11, wherein the processing unit specifies the scanned image subsequent to the scanned image determined as a first aggregation range-specifying document image by the detection processing, as a start point of the aggregation target range, specifies the scanned image preceding the scanned image determined as a second aggregation range-specifying document image by the detection processing, as an end point of the aggregation target range, and specifies a range from the start point to the end point as the aggregation target range.

17. The electronic apparatus according to claim 16, wherein
the processing unit sets a number-of-aggregated-images candidate that can divide the number of the scanned images included in the aggregation target range and that has a highest value, of prescribed number-of-aggregated-images candidates, as a number of aggregated images, and
the printing unit aggregate-prints the scanned images included in the aggregation target range by the number of aggregated images.

18. The electronic apparatus according to claim 17, wherein
when the number of the scanned images included in the aggregation target range is indivisible by any of the number-of-aggregated-images candidates, the processing unit sets the number-of-aggregated-images candidate that results in a smallest blank space in a print result, of the number-of-aggregated-images candidates, as the number of aggregated images, and
the printing unit aggregate-prints the scanned images included in the aggregation target range by the number of aggregated images.

19. The electronic apparatus according to claim 17, wherein
when the number of the scanned images included in the aggregation target range is indivisible by any of the number-of-aggregated-images candidates, the processing unit sets the number-of-aggregated-images candidate that results in a smallest number of printed sheets, of the number-of-aggregated-images candidates, as the number of aggregated images,
when there is a plurality of the number-of-aggregated-images candidates determined as resulting in an equal number of printed sheets, the processing unit sets the number-of-aggregated-images candidate that results in a smallest blank space in a print result, as the number of aggregated images, and
the printing unit aggregate-prints the scanned images included in the aggregation target range by the number of aggregated images.

* * * * *